Sept. 24, 1940.  R. E. BITNER  2,215,900
CATADIOPTRICAL LENS
Filed Oct. 28, 1939  2 Sheets-Sheet 1

Ralph E. Bitner
INVENTOR

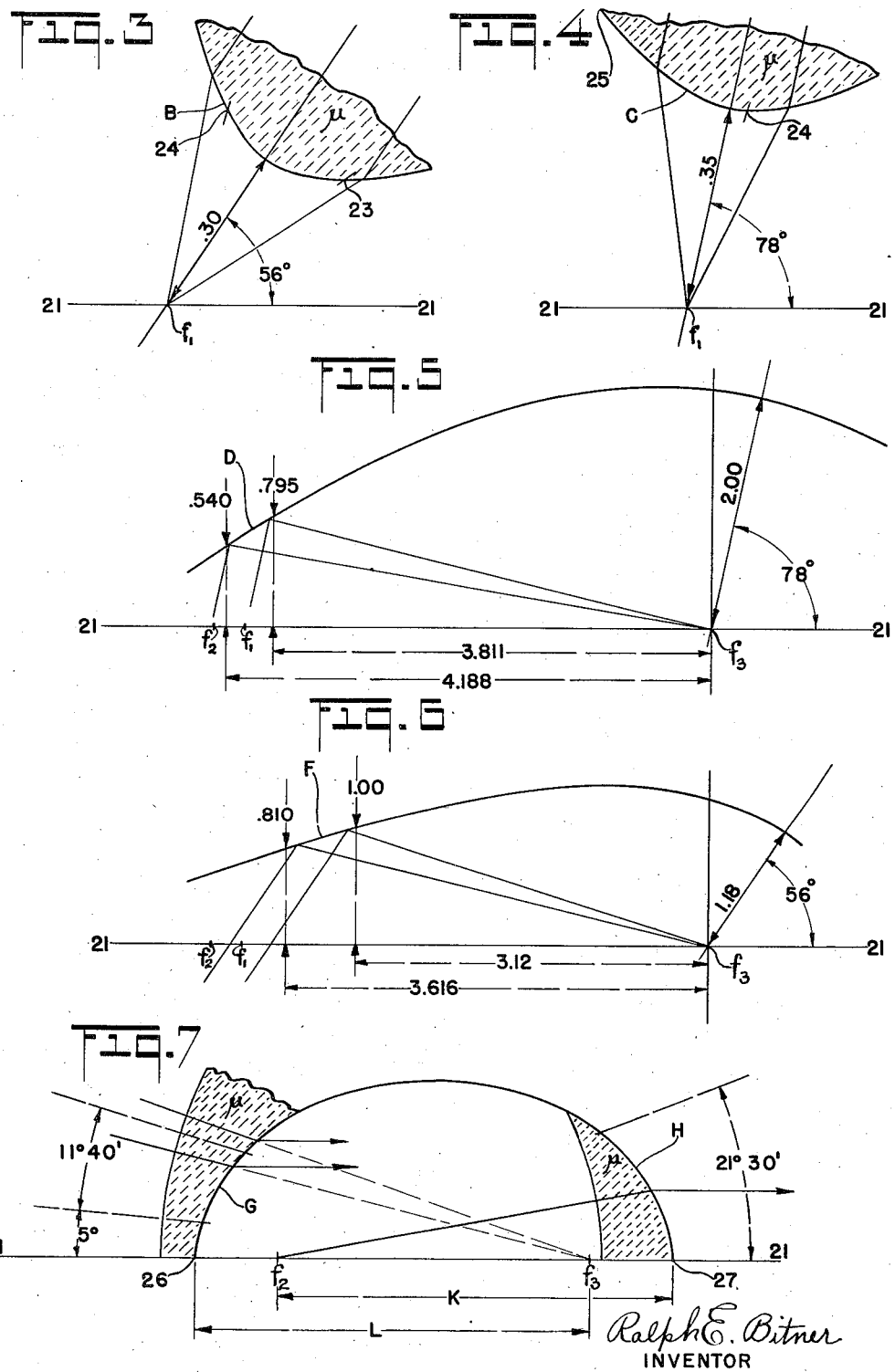

Patented Sept. 24, 1940

2,215,900

UNITED STATES PATENT OFFICE 2,215,900

CATADIOPTRICAL LENS

Ralph E. Bitner, New York, N. Y.

Application October 28, 1939, Serial No. 301,815

6 Claims. (Cl. 240—41.3)

This invention relates to lens units that both reflect and refract and more particularly relates to lenses cast from a single block of transparent material, the surfaces of which are aspherical.

The use of aspherical surfaces for lens units was first proposed many years ago by some of the first investigators in optical science. It has been shown that these surfaces, called "Cartesian" surfaces, are free from spherical aberration and represent the precise geometrical form which an optical surface should have in order to transmit radiant energy, either by refraction or by reflection, according to the known laws of these phenomena, accurately from one focus to the other. For a modern scientific treatment of this subject, see Southall's "Mirrors, Prisms, and Lenses," page 518.

In spite of their obvious advantages, very few lenses with these surfaces have been manufactured because of the difficulties in grinding and polishing. Recently, however, with the advent of mouldable synthetic resins of good optical qualities, it is possible to produce at a reduced cost, aspherical lenses of high quality. Such a lens is described in the U. S. Patent No. 2,086,286, issued to N. M. Stanley, although the exact surface configuration in this case is not specified.

U. S. Patent No. 1,507,212 issued to L. Silberstein, illustrates the application of an aspherical surface to part of a lens system and gives mathematical equations for calculating such surfaces.

The present invention employs a single block of transparent material with a cavity at one side thereof, symmetrical about the optical axis, in which the source of light is positioned. The walls of this cavity are formed with surfaces of revolution which refract the rays of light from the source and direct them through the lens in three well defined pencils. One of these, the central or paraxial pencil, is again refracted by an exit surface and is thereby rendered parallel. The other pencils are first internally reflected and then refracted at the exit surface into two other parallel beams, all three resultant beams being parallel to the optical axis. All surfaces used are surfaces of revolution taken around the optical axis and all are known generally as "Cartesian" surfaces. The lens block is so designed as to be moulded in a simple two piece mould of any suitable transparent material but preferably of transparent synthetic resin. Since the source is surrounded by the lens it is possible to utilize all luminous flux radiated, and project it all in a single parallel beam. By designing the reflecting surfaces of the lens unit to receive the incident beams at a greater angle than the critical angle, total reflection is obtained without the use of silvering or any other metallic reflector.

Throughout this specification the relative position of lines and surfaces will be indicated by specifying the angle between the line and a normal to the surface.

One of the objects of the invention is to provide a lens unit cast from a single block of transparent material which will focus practically all the available light rays into a single parallel beam.

Another object of the invention is to provide a singe lens unit which reflects the marginal and intermediate rays by means of total internal reflection, thereby eliminating the necessity of metallic reflectors.

Another object of the invention is to provide a lens of easily mouldable material having refracting and reflecting surfaces free from spherical aberration.

Another object of the invention is to provide a flashlight lens unit which will gather in and focus all the available light rays from a commercial flashlight lamp.

Another object of the invention is to provide an efficient lens which has a small overall diameter in comparison to the size of the source, generally having a ratio of less than three.

Still another object of the invention is to provide a lens which may be moulded of synthetic resin or other suitable material in a simple two piece mould by automatic machinery.

Other objects and structural details of the invention will be apparent from the following description when read in connection with the accompanying drawings, wherein, Fig. 1 is a sectional view taken on a meridian plane of the lens unit, showing the associated curves used in forming the surfaces.

Fig. 3 is a sectional view of the refracting entrance surface adjoining that shown in Fig. 2 with dimensions showing its focal length and axial inclination.

Fig. 4 is a sectional view of another refracting entrance surface adjoining that shown in Fig. 3 and similar to it except for focal length and axial displacement.

Fig. 5 is a sectional view of one of the reflecting surfaces showing the characteristics of the parabola from which it is taken.

Fig. 6 is a sectional view of the second reflecting surface, similar to Fig. 5 except for axial displacement and focal length.

Fig. 7 is a sectional view of the two exit surfaces, both shown as a part of the ellipsoid from which they were derived.

Figure 1:
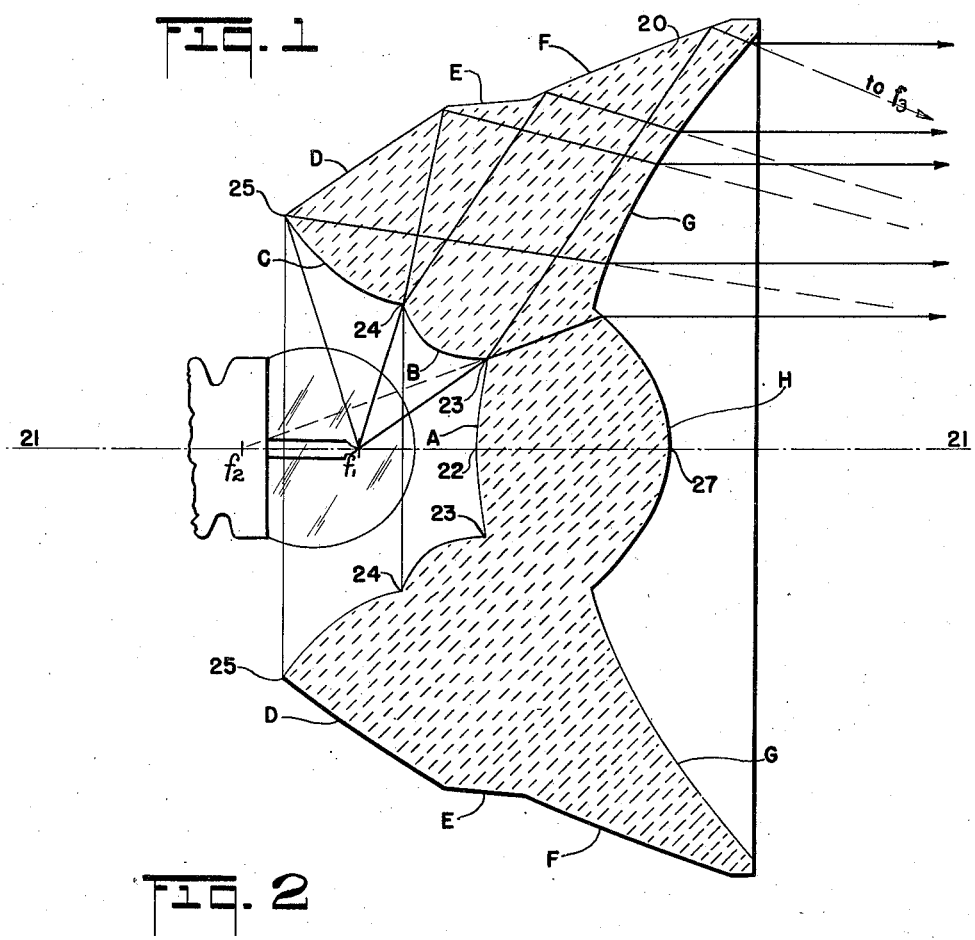

Referring now to Fig. 1, the lens block 20 is indicated with an optical axis 21—21 and a source of light $f_1$ on said axis. This source may be any convenient lamp or light image but the present design is intended to be used with a small flashlight bulb. The lens unit is a solid block bounded by eight faces, all surfaces of revolution about the optical axis 21—21. These surfaces are as follows: (1) A paraxial entrance surface A consisting of an aspherical quartic surface of revolution which receives the light rays from the source $f_1$ and refracts them to a virtual focus of $f_2$. (2) A refracting entrance surface B consisting of a convex hyperboloid formed by the revolution of a section of a hyperbola about the axis and refracting the rays from $f_1$ into a beam of parallel rays. (3) A refracting entrance surface C similar to B except for focal length and axial inclination. (4) A reflecting surface D consisting of a paraboloid formed by the revolution of a section of a parabola about the optical axis and reflecting the parallel rays from surface C toward a focal point $f_3$ on the optical axis. (5) A part of the surface of a cone E which connects two optical surfaces but has no optical function of its own. (6) a reflecting surface F similar to D but receiving parallel rays from surface B and reflecting them by a different path toward the point $f_3$. (7) A refracting concave exit surface G consisting of an ellipsoid formed by the revolution of a section of an ellipse about the optical axis and refracting the light rays received from surfaces D and F into a beam of parallel rays. (8) A refracting paraxial exit surface H formed by the revolution of a section of an ellipse about the optical axis and refracting the light rays coming in the direction from the virtual focus $f_2$ into a beam of parallel rays.

Figure 2:
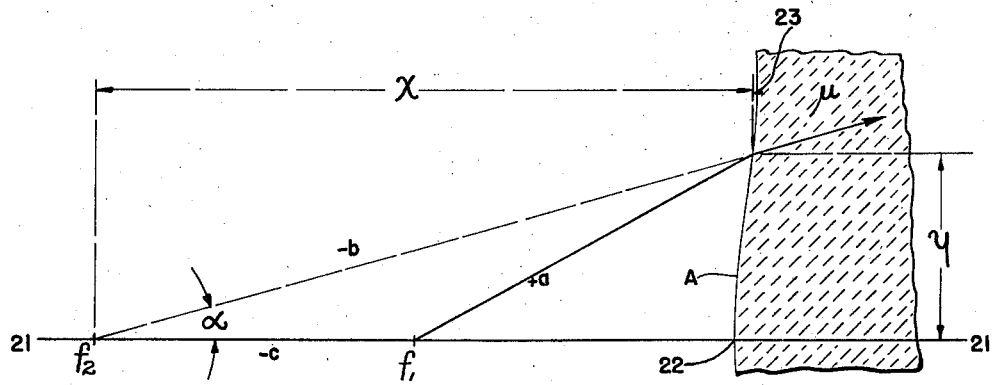
Fig. 2 is a half sectional view showing that part of the lens block nearest the source.

Each of these eight surfaces will now be considered in detail and methods and means for their computation disclosed. Fig. 2 is designed to show some of the more important characteristics of paraxial surface A. The optical axis is represented by the line 21—21 as in Fig. 1. The source $f_1$ is placed .275 unit from the axial surface point 22 and the virtual focal point $f_2$ from which the refracted rays appear to originate, is just twice this distance or .55 unit. The resultant curvature of face A is far from a spherical surface and may change its curvature from convex at the axis to concave near the rim. The equation of this curve, as generally expressed in terms of the coordinates of any point on the curve, is a complicated fourth degree equation or quartic and is very difficult to compute. Silberstein in Patent 1,507,212 gives an approximate method of solution by expansion into a series. I prefer, however, to calculate such curves by using a parametric form with the length of optical path as the parameter. In accordance with the fundamental concepts of image formation, this equation is $G = a + \mu b$ where $a$ is the length of the incident ray, $b$ the length of the refracted ray, $\mu$ the refractive index and $G$ a constant quantity. When a virtual image is formed, as is the case in Fig. 2, the length $b$ is considered negative, hence the equation becomes $G = a - \mu b$.

From the geometrical construction as shown in Fig. 2 it is obvious that the following relations are true:

$$a^2 = b^2 + c^2 - 2bc \cos \alpha$$
$$X = b \cos \alpha$$
$$X^2 + Y^2 = b^2$$

By suitable rearrangement we get:

$$X = \frac{c^2 - a^2 + b^2}{2c}$$

$$Y = \sqrt{b^2 - x^2}$$

where X and Y are the coordinates of any point on the required curve and the parametric quantity $$b = \frac{a - G}{\mu}$$

This series of equations may be used for computing the points on the refracting surface and a much simpler and shorter method results. It has one disadvantage over the older method in that neither the value of X or Y is known at the start of the computation. This feature is of no consequence, however, when a curve is to be computed with a large number of points.

The lens block herein disclosed was designed for a lens material having an index of refraction equal to 1.52. It is obvious that other similar lenses may be designed within the scope of this invention which have different indices of refraction.

Fig. 3 shows the construction of a convex refracting surface B which adjoins the surface shown in Fig. 2. This part of the lens receives light rays emanating from the source $f_1$ on the optical axis and refracts them into a parallel beam. The curve is a hyperbola with its apex .3 unit from the source and an eccentricity of 1.52. The portion used in the lens block is designated by the line 23—24 and the angular tilt of 56° given the axis is to assure easy withdrawal of the die during the moulding operation.

Fig. 4 shows the construction of the hyperboloid similar to the one in Fig. 3 except for focal length and axial tilt. As may be seen from Fig. 1, this refracting surface C adjoins the surface B. Its axis is 78° from the optical axis of the lens block with the apex being .35 unit from the source of light $f_1$. The line between the points 24—25 denotes the segment used in the block. The eccentricity of this curve is also 1.52.

Figs. 5 and 6 show the characteristics of a pair of parabolas which are used to form surfaces of revolution about the main optical axis. The use of paraboloids as focussing means is quite old in the flashlight art but previous structures have placed the light source at the focus of the paraboloid to obtain a reflected parallel beam directly. The present design uses the paraboloid in a reversed manner since the parallel light rays are received by the mirror and reflected toward the focal point $f_3$. The direction of light with respect to the paraboloid is, therefore, opposite to that in general usage.

The primary reason for employing the paraboloids in this manner is to save space. If the older design were employed, the resultant diameter of the lens block would be greatly increased. Another advantage of using paraboloids for point focussing is that the resultant light beam is more concentrated as it leaves the lens and therefore permits the formation of a smaller and more intense spot of light.

It will be obvious from the drawings (Figs. 1, 3, and 6) that the hyperboloid B and the paraboloid F cooperate to direct the same pencils of light from the source $f_1$ to a point $f_3$ on the axis. These points are spaced 4 units apart. The hyperboloid B is formed with its axis 56° from the optical axis, hence the axis of the paraboloid F is similarly disposed. The dimensions as indicated in Figs. 3, 4, 5, and 6 are in units of any system of measurement, the radius of the circle forming the exit edge of the block being taken as one.

The refracting hyperboloid C and the reflecting paraboloid D, as shown in Figs. 1, 4, and 5, also cooperate to direct another group of light rays from the source $f_1$ toward the point $f_3$. Both of these sections have the same axial inclination, 78°, this value being a result of an effort to keep the reflecting angle in the paraboloid well within the limit for total internal reflection and at the same time gather in as much light from the source as possible. The limiting angle for total reflection in a medium with a refractive index of 1.52 is 41° 8' 20".

Fig. 7 illustrates the formation of exit surfaces G and H, both ellipsoids and both refracting. Every refracting ellipsoid must have its eccentricity equal to the reciprocal of the refractive index of the medium, hence one figure may be used for both surfaces although in the actual lens block, surface G is derived from an ellipse 3.5 times as large as the ellipse used to form the surface H.

The extent of surface G is indicated by angular boundaries, 11° 40' and 5°, with point $f_3$ taken as a center. The distance L is 3.5 units. As may be seen from Fig. 1, the rays of light are reflected from surfaces D and F, directed toward the point $f_3$. The concave ellipsoid G renders these rays parallel to the optical axis. The ellipse which forms this surface has a major axis (26—27) of 4.222 units and a minor axis of 3.18 units. The distance between foci is 2.7777 units.

Surface H is a convex ellipsoid which refracts the rays of light that have been refracted by surface A. While in the lens block, these rays are divergent with $f_2$ as a virtual focus. The surface H renders them parallel to the optical axis. The focal distance K of this lens component, measured from $f_2$ to the axial boundary 27, is 1 unit and therefore all characteristic values of the generating ellipse will have to be reduced in the ratio 3.5 to 1 as compared to the values given in the above paragraph.

While I have described what I consider to be a highly desirable embodiment of my invention, it is obvious that many changes in form could be made without departing from the spirit of my invention, and I, therefore, do not limit myself to the exact form herein shown and described nor to anything less than the whole of my invention as hereinbefore set forth, and hereinafter claimed.

I claim:

1. A lens block for focussing light from a concentrated source into a parallel beam having in combination; one paraxial lens component and two marginal lens mirror combinations; said paraxial lens comprising a quartic entrance surface and a convex ellipsoid exit surface, both of said surfaces having their axes coincident with the optical axis of the lens block; one of said marginal lens mirror combinations composed of a hyperboloid refracting entrance surface, a paraboloid total internal reflection mirror and a concave ellipsoid refracting exit surface, the axes of said hyperboloid and said paraboloid disposed at equal angular inclinations to the optical axis of the block; the second of said marginal lens mirror combinations composed of a hyperboloid refracting entrance surface, a paraboloid total internal reflection mirror and a concave ellipsoid refracting exit surface, the axes of said hyperboloid and said paraboloid disposed at equal angular inclinations to the optical axis of the block; the first mentioned hyperboloid having a focal length which is substantially less than the focal length of the second mentioned hyperboloid; said second concave ellipsoid exit surface being a continuation of the first mentioned concave ellipsoid exit surface and all of said surface components being surfaces of revolution about the optical axis.

2. A lens block for focussing light from a concentrated source into a parallel beam having in combination; one paraxial lens component and two marginal lens mirror combinations; said paraxial lens comprising a quartic entrance surface and a convex ellipsoid exit surface, both of said surfaces having their axes coincident with the optical axis of the lens block; one of said marginal lens mirror combinations composed of a hyperboloid refraction entrance surface, a paraboloid total internal reflection mirror, and a concave ellipsoid refracting exit surface, the axes of said hyperboloid and said paraboloid disposed at equal angular inclinations to the optical axis of the block; the second of said marginal lens mirror combinations composed of a hyperboloid refracting entrance surface, a paraboloid total internal reflection mirror and a concave ellipsoid refracting exit surface, the axes of said hyperboloid and said paraboloid disposed at equal angular inclinations to the optical axis of the block; the first mentioned angular inclinations being substantially less than the second mentioned inclinations; and all of said surface components being surfaces of revolution about the optical axis.

3. A lens block for focussing light from a concentrated source into a parallel beam having in combination; one paraxial lens component and two marginal lens mirror combinations; said paraxial lens comprising a quartic entrance surface and a convex ellipsoid exit surface, both of said surfaces having their axes coincident with the optical axis of the lens block; one of said marginal lens mirror combinations composed of a hyperboloid refracting entrance surface, a paraboloid total internal reflection mirror, and a concave ellipsoid refracting exit surface, the axes of said hyperboloid and said paraboloid disposed at equal angular inclinations to the optical axis of the block; the second of said marginal lens mirror combinations composed of a hyperboloid refracting entrance surface, a paraboloid total internal reflection mirror, and a concave ellipsoid refracting exit surface, the axes of said hyperboloid and said paraboloid disposed at equal angular inclinations to the optical axis of the block; the first mentioned angular inclinations being substantially less than the second mentioned inclinations; said second concave ellipsoid exit surface being a continuation of the first mentioned concave ellipsoid exit surface and all of said surface components being surfaces of revolution about the optical axis.

4. A lens block for focussing light from a concentrated source into a parallel beam having in combination; one paraxial lens component and a plurality of marginal lens mirror combinations; said paraxial lens comprising a quartic entrance surface and a convex ellipsoid exit surface, both of said surfaces having their axes coincident with the optical axis of the lens block; said plurality of lens mirror combinations each composed of a hyperboloid refracting entrance surface, a paraboloid total internal reflection mirror and a concave ellipsoid refracting exit surface, the axes of said hyperboloid and said paraboloid in any one of said combinations disposed at equal angular inclinations to the axis of the block; and all of said surface components being surfaces of revolution about the optical axis.

5. A lens block for focussing light from a concentrated source into a parallel beam having in combination; one paraxial lens component and a plurality of marginal lens mirror combinations; said paraxial lens comprising a quartic entrance surface and a convex ellipsoid exit surface, both of said surfaces having their axes coincident with the optical axis of the lens block; said plurality of lens mirror combinations each composed of a hyperboloid refracting entrance surface, a paraboloid total internal reflection mirror and a concave ellipsoid refracting exit surface, the axes of said hyperboloid and said paraboloid in any one of said combinations disposed at equal angular inclinations to the optical axis of the block; the axial angular inclinations of said combinations being substantially different, one from the other and all of said surface components being surfaces of revolution about the optical axis.

6. A lens block for focussing light from a concentrated source into a parallel beam having in combination; one paraxial lens component and a plurality of marginal lens mirror combinations; said paraxial lens comprising a quartic entrance and a convex ellipsoid exit surface; both of said surfaces having their axes coincident with the optical axis of the lens block; said plurality of lens mirror combinations each composed of a hyperboloid refracting entrance surface, a paraboloid total internal reflection mirror and a concave ellipsoid refracting exit surface, the axes of said hyperboloid and said paraboloid in any one of said combinations disposed at equal angular inclinations to the optical axis of the block; said concave ellipsoid exit surfaces being continuations of a single ellipsoid and all of said surface components being surfaces of revolution about the optical axis.

RALPH E. BITNER.